United States Patent
Suelzle

[11] Patent Number: 5,614,770
[45] Date of Patent: Mar. 25, 1997

[54] STRUCTURE AND METHOD FOR PERFORMING ACTIVE INJECTION MODE FILTERING ON AN AC POWER SYSTEM

[75] Inventor: Larry R. Suelzle, Los Altos, Calif.

[73] Assignee: Helionetics, Inc., Irvine, Calif.

[21] Appl. No.: 254,230

[22] Filed: Jun. 6, 1994

[51] Int. Cl.$^6$ .................. H02M 1/12; H02J 3/01
[52] U.S. Cl. ........................... 307/105; 363/39
[58] Field of Search ................. 307/105, 102, 307/103; 363/39, 40; 323/208–211

[56] References Cited

U.S. PATENT DOCUMENTS

| | | |
|---|---|---|
| 3,531,652 | 9/1970 | Aemmer et al. . |
| 3,628,057 | 12/1971 | Mueller . |
| 3,825,814 | 7/1974 | Pelly . |
| 4,209,757 | 6/1980 | Becker . |
| 4,529,925 | 7/1985 | Tanaka et al. . |
| 4,680,531 | 7/1987 | Rey et al. . |
| 4,757,415 | 7/1988 | Smith et al. ............... 361/76 |
| 4,812,669 | 3/1989 | Takeda et al. . |
| 4,835,411 | 5/1989 | Takeda . |
| 4,906,860 | 3/1990 | Asaeda . |
| 4,967,334 | 10/1990 | Cook et al. . |
| 5,162,983 | 11/1992 | Kumagai . |
| 5,172,009 | 12/1992 | Mohan . |
| 5,198,746 | 3/1993 | Gyugyi et al. . |
| 5,345,375 | 9/1994 | Mohan . |

FOREIGN PATENT DOCUMENTS

| | | |
|---|---|---|
| 0254073A2 | 1/1988 | European Pat. Off. . |
| 0442492A2 | 8/1991 | European Pat. Off. . |
| 3832922A1 | 9/1987 | Germany . |
| 4123005A1 | 7/1990 | Germany . |
| 57-71234 | 5/1982 | Japan . |
| WO89/06879 | 7/1989 | WIPO . |

OTHER PUBLICATIONS

Article entitled: "Active Filter Device for Compensating Wide–Band Harmonics" by Kanematsu USA, Inc., Arlington Heights, IL, no date.

*Primary Examiner*—Fritz Fleming
*Attorney, Agent, or Firm*—Skjerven, Morrill, MacPherson, Franklin & Friel; E. Eric Hoffman

[57] ABSTRACT

An active current injection device is used to generate and inject fundamental and non-fundamental frequency current components onto an AC power line. A current pump control circuit receives an input signal which is representative of the line voltage of the power line. In response, the current pump control circuit generates a control signal which is used to generate a current component at the fundamental frequency which lags the line voltage by approximately 90 degrees. This fundamental frequency current component is transmitted through an impedance to the power line, thereby causing a voltage drop at the fundamental frequency across the impedance which is within a selected range about the line voltage. In one embodiment, this selected range is equal to approximately 25 to approximately 150 percent of the line voltage. Also, a damping control circuit receives an input signal which is representative of the line voltage of the power line. In response, the damping control circuit generates an output signal having a first component proportional to the line voltage and a second component proportional to the rate of change of the line voltage. This output signal is used to generate an electronic load current component which loads the non-fundamental frequency components of the line voltage. In addition, a four-wire adapter circuit allows an active current injection device to be operated from a four-conductor, three-phase AC power line using three transducers.

20 Claims, 12 Drawing Sheets

STRUCTURE AND METHOD FOR PERFORMING ACTIVE INJECTION MODE FILTERING ON AN AC POWER SYSTEM

CROSS-REFERENCE TO RELATED APPLICATION

The present invention is related to co-pending U.S. patent application Ser. No. 07/934,924 entitled "Active Filter for Reducing Non-Fundamental Currents and Voltages" filed Aug. 25, 1992 by Larry R. Suelzle and Alfred L. Fischer.

FIELD OF THE INVENTION

The present invention generally relates to an apparatus and method for injecting non-fundamental frequency current components onto an AC power line, and in particular to a shunt-mode active injection mode (AIM) filter which provides the non-fundamental frequency currents drawn by a non-linear load to prevent those non-fundamental frequency currents from flowing to the AC power source.

BACKGROUND OF THE INVENTION

In conventional alternating current power systems, power is transmitted from an AC power source, through a network of power lines and through transformers to supply either three-phase or single-phase loads. These loads typically consist of both linear and non-linear elements. Power is provided on the power system at a fundamental frequency, $f_0$, typically 60 Hz. However, certain non-linear loads also draw undesired currents having frequencies other than the fundamental line frequency (e.g., harmonics $f_2=2f_0$, $f_3=3f_0$, etc.). These undesired current components are referred to as non-fundamental frequency currents.

Non-linear loads, such as AC-DC rectifier power supplies, draw non-fundamental frequency currents. Typically, these non-fundamental frequency currents are supplied from the AC power source to the load along power lines and through transformers. Excessive non-fundamental frequency currents can produce serious voltage distortion on power lines when they interact with the source impedances of the power system (including the impedances of the AC power source and the power lines). Excessive non-fundamental frequency currents and their associated voltages can also cause interference, overheating of power lines and transformers and malfunctioning of other equipment connected to the upstream AC power system.

An AIM filter is an electronic power conversion device that is connected in shunt across a power line to compensate for non-fundamental frequency currents drawn by a load. The AIM filter is typically located near the load which draws the undesirable non-fundamental frequency currents. In general, an AIM filter senses the non-fundamental frequency currents being drawn by the load, attempts to generate currents which match these non-fundamental frequency currents, and injects these matching non-fundamental frequency currents back onto the power line. In this manner, the AIM filter provides the non-fundamental frequency current components required by the load so that these currents do not flow from the AC power source to the point where the AIM filter connects to the power line.

An AIM device can also be used to test the response of an AC power source to nonlinear loading or the imperviousness of a load (e.g., electronic equipment) to poor quality electrical power. In such an application, the AIM device does not sense the current present on the power line, but instead generates predetermined non-fundamental frequency current components. These current components are then injected onto a power line that might not otherwise experience non-fundamental frequency currents. The response of the AC power source or the load is then observed to determine how it will perform when exposed to such conditions.

FIG. 1 is a single-line diagram of a prior art AIM filter 17 connected to an AC power system. AC power source 10 transmits a current of $I_s$ at a voltage of $V_{LINE}$ to load 12 on power line 11. Load 12 generally includes a linear element 41 having impedance $Z_L$ and a non-fundamental frequency current generator 42, which draw currents $I_{ZL}$ and $I_H$, respectively.

Current transducer 15 is coupled to power line 11 to sense the current $I_L$ drawn by load 12. Current transducer 15 provides a signal $V_{10}$, which is proportional to current $I_L$, to harmonic current detector 16. Harmonic current detector 16 filters the fundamental frequency current component of signal $V_{10}$ to produce a voltage signal $V_{11}$ proportional to the non-fundamental frequency current components being drawn by load 12, i.e. the non-fundamental frequency current components of both $I_{ZL}$ and $I_H$.

Voltage signal $V_{11}$ is transmitted through summing node 18, amplifier 19 and summing node 20 of transconductance amplifier 24. In response, transconductance amplifier 24 generates a current output $I_1$ which is proportional to input voltage signal $V_{11}$. The gain of transconductance amplifier 24 is controlled so that the current $I_t$ produced by transconductance amplifier 24 is equal to the non-fundamental frequency current components of the load current $I_L$.

Transconductance amplifier 24 typically includes a pulse width modulator circuit 23, a high-speed switching circuit 26, an output inductor 30 and a current transducer 28. Transducer 28 provides a current feedback signal $V_{12}$ to summing node 18 to make the amplifier a transconductance amplifier, i.e. an amplifier that produces an output current in response to an input voltage signal. Inductor 30 and passive filter 32 remove high frequency switching current components introduced by pulse width modulator circuit 23 and transistor switching circuit 26.

Voltage sensor 22 provides a line voltage feed forward signal inside the current control feedback loop that reduces the necessary gain of the current control feedback loop, increasing the stability of that loop.

The output current $I_1$ of transconductance amplifier 24 produces all of the non-fundamental frequency current components of load current $I_L$, including $I_H$ and the non-fundamental frequency components of $I_{ZL}$. Thus, the effect of current $I_1$, is to isolate the non-fundamental frequency components of linear element 41 from the AC power line and unload any non-fundamental frequency voltage components of $V_{LINE}$. This unloading can result in instability of the power system and increased non-fundamental frequency voltages on the power system.

For transconductance amplifier 24 to produce the desired flow of current on power line 11, the transconductance amplifier 24 must be able to generate an instantaneous voltage V1 equal to $$V_{LINE}(t)=L*dI1/dt$$

where $V_{LINE}(t)$ is the AC power line voltage, $V_{LINE}$, at time t at node 13, L is the inductance of inductor 30 and dI1/dt is the derivative of output current I1 with respect to time.

In AIM filter applications such as the one described above, dI1/dt can be substantial, especially in three-phase systems. For a typical non-linear rectifier type load, the waveform of load current $I_L$ comprises alternating positive and negative rectangular current pulses with fast rising and falling edges, i.e. a large dI1/dt. The voltage that must be produced across inductor 30 (L*dI1/dt) to produce the fast rising and falling edges of the current pulses can approach the peak value of the line voltage $V_{LINE}$. The peak value of dI1/dt typically occurs when the line voltage $V_{LINE}$ is between 50% and 100% of its peak value. Consequently, the required voltage V1 which must be generated at the output of switching circuit 26 approaches twice the peak voltage $V_{LINE}$ of power line 11. If the transistor switching circuit 26 is not capable of providing the required voltage V1, transconductance amplifier 24 will not be able to produce the desired output current I1.

Even at the lowest typical voltages of $V_{LINE}$ (e.g. 208 Volts AC line-to-line), the peak output voltage V1 of switching circuit 26 must be at least 600 V to provide the desired output currents. The fast switching devices needed to generate high frequency currents at voltages above approximately 600 V are either not available or expensive. Furthermore, the switching losses in the switching circuit 26 increase substantially as the output voltage V1 increases, thereby resulting in a loss of efficiency within the transconductance amplifier 24.

Guidelines presently being discussed for harmonic suppression of utility line connected equipment and adopted as specifications for some new installations place lower limits on the allowable high frequency harmonic currents than on the allowable lower frequency harmonic currents. (See, e.g., IEEE Practices and Requirements for Harmonic Control in Electric Power Systems, IEEE Standard 519-1992.)

It would therefore be desirable to have an AIM filter having a switching stage capable of operating at a reduced voltage.

SUMMARY OF THE INVENTION

In one embodiment of the present invention, an active current injection device is used to generate and inject fundamental and non-fundamental frequency current components onto an AC power line. A current pump control circuit receives an input signal which is representative of the line voltage of the power line. In response, the current pump control circuit generates a control signal which is used to generate a current component at the fundamental frequency which lags the line voltage by approximately 90 degrees. This fundamental frequency current component is transmitted through an impedance to the power line, thereby causing a voltage drop at the fundamental frequency across the impedance. This voltage drop is within a selected range about the line voltage. In one embodiment, this selected range is equal to approximately 25 to approximately 150 percent of the line voltage. In another embodiment, this voltage drop is approximately equal to the line voltage. The voltage dropped across the impedance reduces the required operating voltage of the active current injection device. In one embodiment, the impedance is a capacitor and the current generated in response to the current pump control circuit advantageously provides current having a leading power factor as seen by the power line.

In another embodiment of the present invention, a damping control circuit receives an input signal which is representative of the line voltage of the power line. In response, the damping control circuit generates an output signal having a first component proportional to the line voltage and a second component proportional to the rate of change of the line voltage. This output signal is used to generate an electronic load current component which is provided to the power line. The electronic load current component loads the non-fundamental frequency components of the line voltage, thereby advantageously preventing both system instability and possible increases in the non-fundamental frequency voltages. System instability and increased non-fundamental frequency voltages were previously caused by the unloading of the non-fundamental frequency voltages in prior art AIM filters. In one embodiment, the electronic load current component is selected to approximate the linear element of a downstream load.

In yet another embodiment of the present invention, a four-conductor adapter circuit is coupled to an active current injection device to facilitate operation in a four-conductor, three-phase system. The four-conductor system includes three power conductors and a neutral conductor. The four-conductor adapter circuit receives inputs from the three power conductors which are representative of the currents on these conductors. In response, the four-conductor adapter circuit creates a first signal proportional to the current on one power conductor minus one third of the current on the neutral conductor and a second signal which is proportional to the current on another power conductor minus one third of the current on the neutral conductor. In one embodiment, the first and second signals are provided to an AIM filter which generates a first output current component responsive to the first signal, a second output current component responsive to the second signal and a third output current component equal to the negative sum of the first and second output current components. The effect of the four-conductor adapter circuit is that the non-fundamental frequency currents flowing from the AC power source on the three power conductors are equal in phase and amplitude and equal to one third of the non-fundamental frequency current flowing to the AC power source on the neutral line.

Further advantages of the present invention will become apparent in view of the following description and drawings.

DETAILED DESCRIPTION OF THE INVENTION

Figure 1:
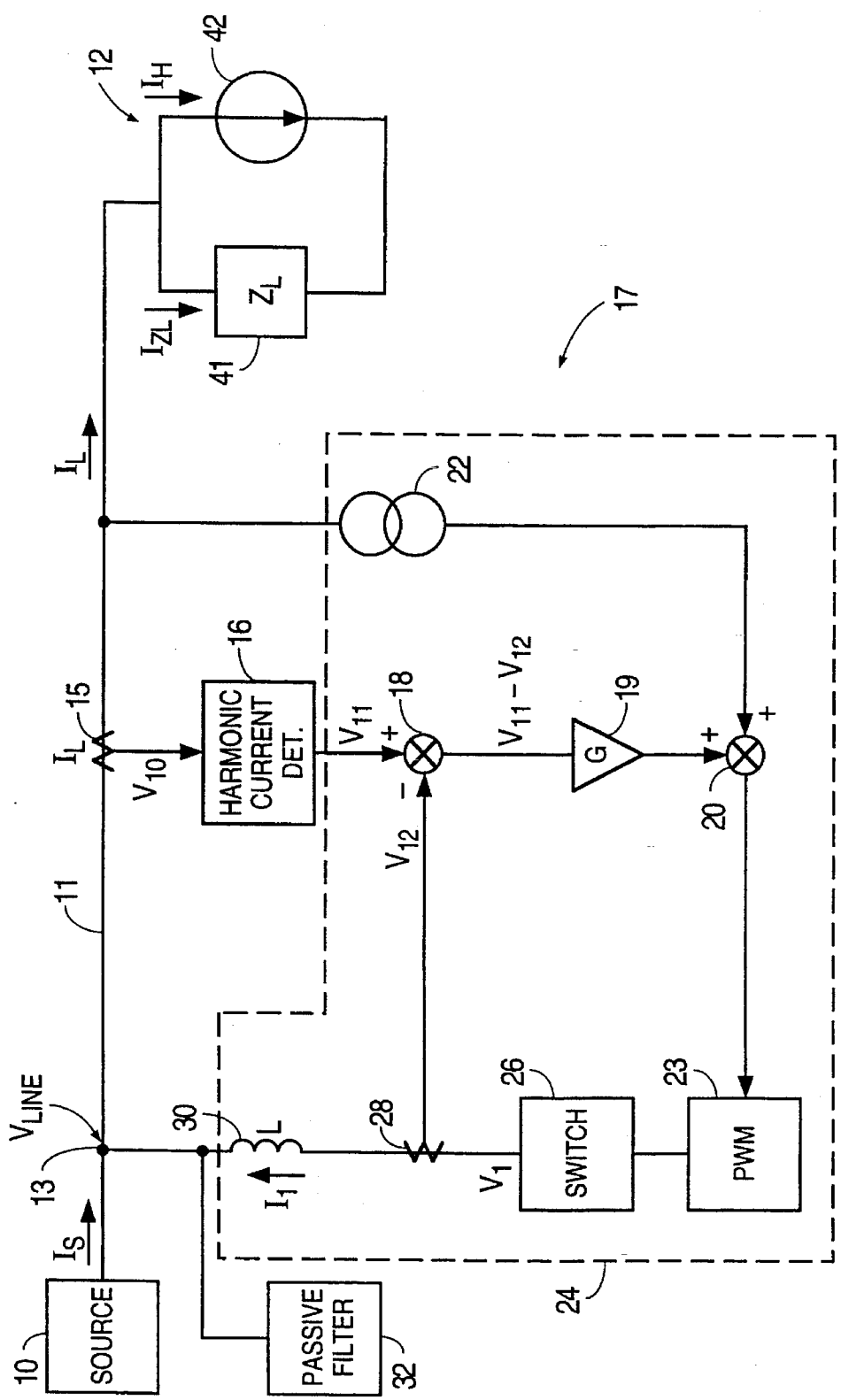
FIG. 1 is a single-line diagram of a prior art AIM filter connected to an AC power system.
Figure 2:
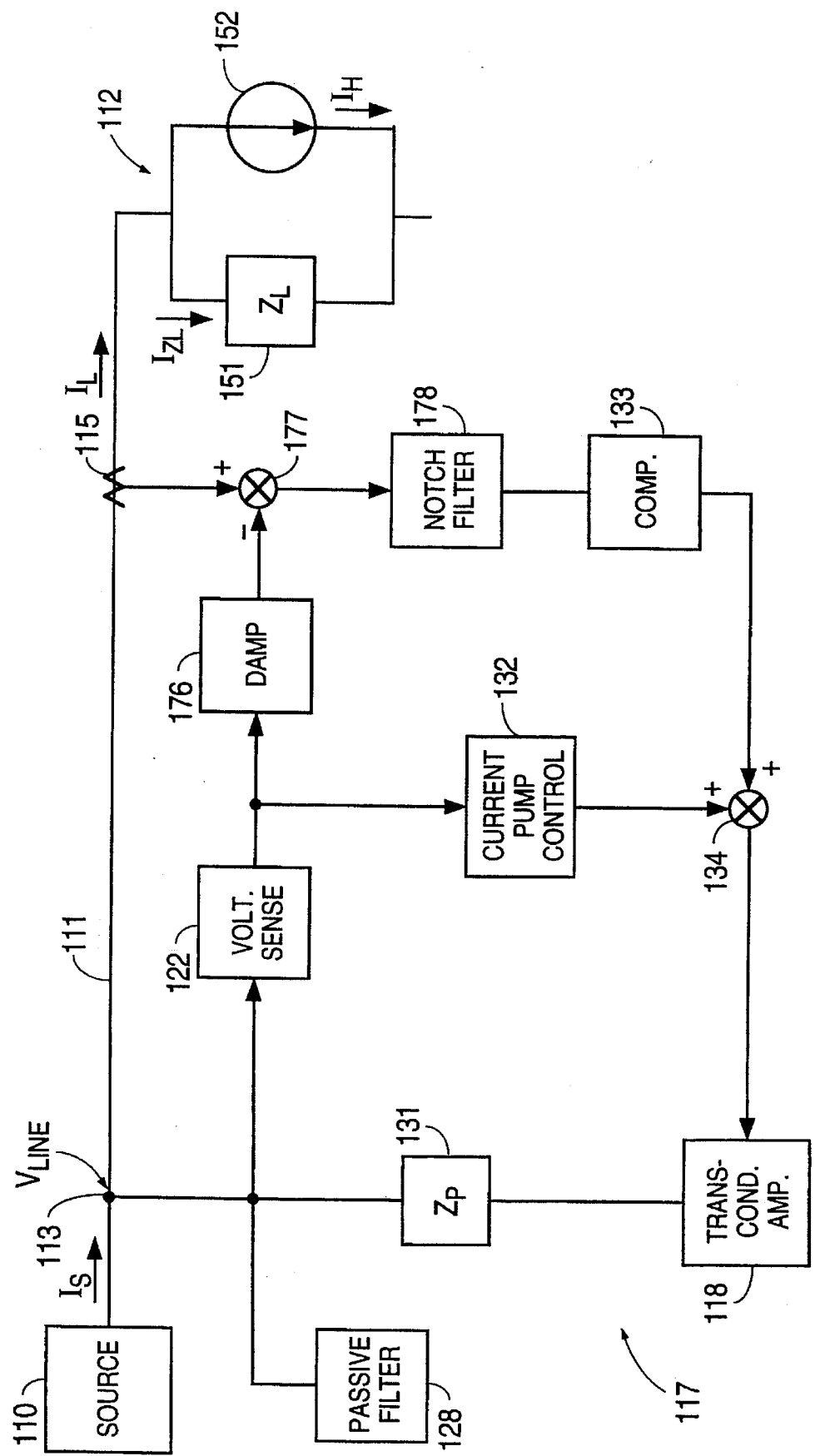
FIG. 2 is a single-line diagram of an active current injection device in accordance with one embodiment of the present invention.

FIG. 2 is a single-line diagram of an active injection mode filter 117 in accordance with one embodiment of the present invention. AC power source 110 is connected to AC load 112 via power line 111. Load 112 typically includes linear element 151 having impedance $Z_L$ and non-fundamental frequency current generator 152, which draw currents $I_{ZL}$ and $I_H$, respectively. Impedance 131 is connected between node 113 of power line 111 and transconductance amplifier 118. Impedance 131 is typically a capacitor, but can also be a capacitor and an inductor connected in parallel. Active current injection device 117 is controlled such that the voltage drop at the fundamental frequency across impedance 131 is a voltage within a selected range about the line voltage. In one embodiment, this selected range is equal to approximately 25 to approximately 150 percent of the voltage at node 113 of power line 111, thereby reducing the operating voltage of transconductance amplifier 118. In another embodiment, the voltage drop across impedance 131 is approximately equal to the voltage at node 113.

The voltage drop across impedance 131 is produced by creating a flow of fundamental frequency current through impedance 131. Transconductance amplifier 118 generates this fundamental frequency current in response to a control signal from current pump control circuit 132. Voltage sensing circuit 122 senses the line voltage at node 113 of power line 111 and provides this line voltage to current pump control circuit 132. In response, current pump control circuit 132 produces a voltage signal proportional to the fundamental frequency component of the line voltage, but lagging in phase by 90 degrees.

The output voltage signal generated by current pump control circuit 132 is selected such that the output current component generated by transconductance amplifier 118 in response to the output voltage signal of current pump control circuit 132 is approximately equal to the fundamental frequency component of the line voltage divided by the known impedance $Z_P$ of impedance 131 at the fundamental frequency. By generating such an output current component at the fundamental frequency, a fundamental frequency voltage component is generated across impedance 131. This fundamental frequency voltage component is within a selected range about the line voltage. In one embodiment, this selected range is equal to approximately 25 to approximately 150 percent of the line voltage. In another embodiment, this fundamental frequency voltage component is approximately equal to the line voltage. In this manner, impedance 131 effectively acts as an AC voltage generator at the fundamental frequency and significantly reduces the required operating voltage of transconductance amplifier 118.

The fundamental frequency current generated by transconductance amplifier 118 in response to current pump control circuit 132 lags the line voltage by 90 degrees. This current is defined as flowing from transconductance amplifier 118 to power line 111. In equivalent terms, a fundamental frequency current flows from power line 111 to transconductance amplifier 118 which is leading the line voltage by 90 degrees. Consequently, active current injection device 117 looks like a capacitive load to the power line 111 at the fundamental frequency. This is generally a desirable characteristic which compensates for the typically inductive nature of power line 111 and load 112.

Line voltage sensing circuit 122 is also connected to damping control circuit 176. Damping control circuit 176 generates an output voltage signal which is transmitted to transconductance amplifier 118 through notch filter 178 and compensation circuit 133. In response, transconductance amplifier 118 generates non-fundamental frequency current components, opposite in phase to the non-fundamental frequency components of the line voltage, thereby effectively creating an electronic load for the non-fundamental frequency voltage components of the line voltage. This electronic load eliminates instability previously caused by prior art AIM filters, particularly when load 112 includes capacitive elements.

The current to load 112 is sensed by transducer 115. The output of transducer 115 is transmitted through notch filter 178, thereby removing the fundamental frequency component of this load current signal. The non-fundamental frequency components of the load current signal are transmitted through compensation block 133 to transconductance amplifier 118. In response, transconductance amplifier 118 generates the non-fundamental frequency current components required by load 112.

Compensation circuit 133 provides amplitude and phase correction to non-fundamental frequency signals received from notch filter 178 to adjust for the amplitude and/or phase shift that is subsequently caused by impedance 131. The transfer function of compensation circuit 133 is given by:

$$Vout/Vin = (Z_P = Z_A)/Z_A,$$

where $Z_P$ is the impedance of impedance 131 and $Z_A$ is the equivalent output shunt impedance of transconductance amplifier 118.

Passive filter 128 and an output inductance (not shown) internal to transconductance amplifier 118 remove the high frequency switching components of the output current introduced by the switching mode transconductance amplifier 118.

The present invention will now be described in more detail in connection with FIG. 3.

Figure 3:
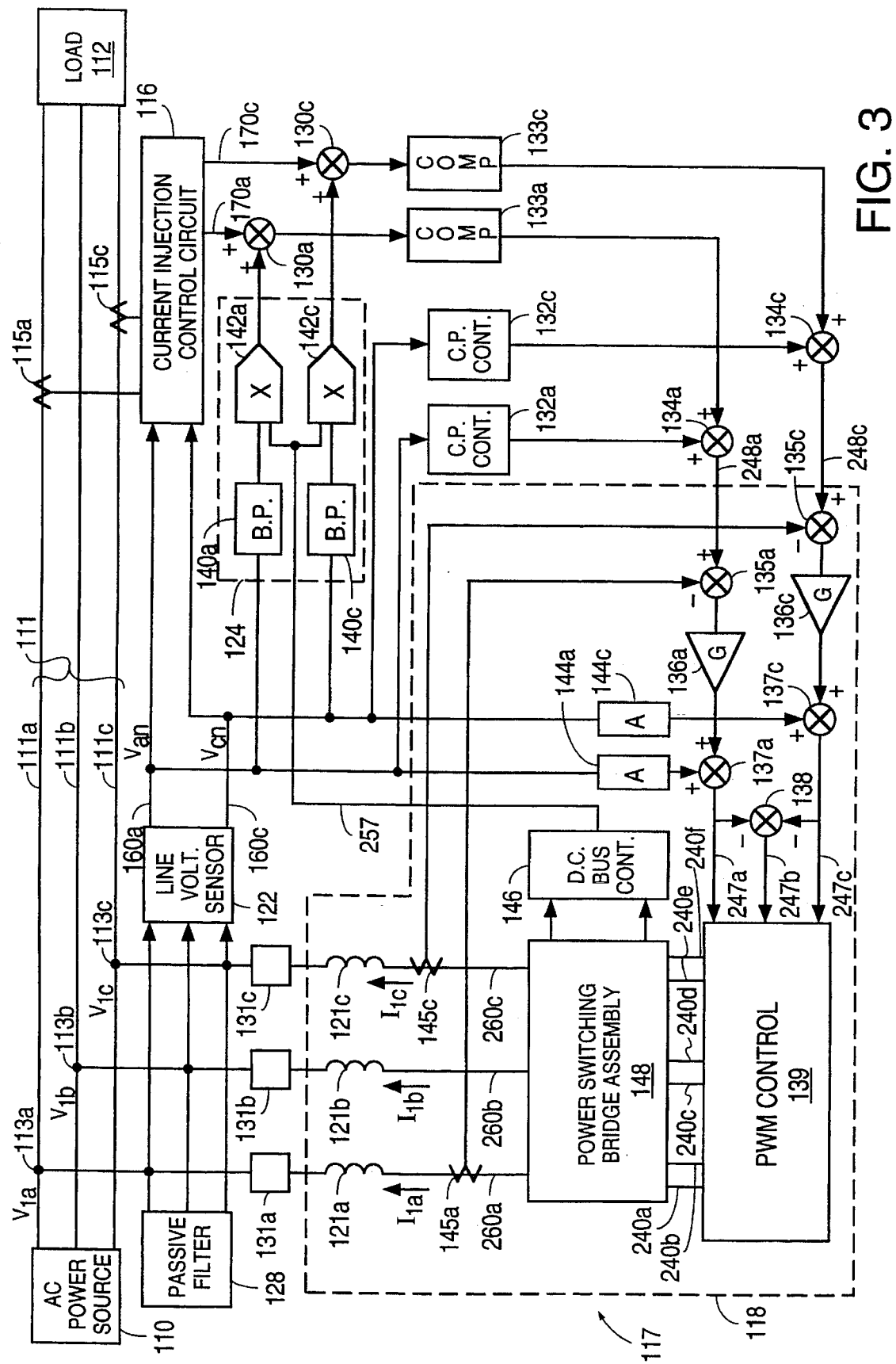
FIG. 3 is a three-phase circuit diagram of active current injection device in accordance with one embodiment of the present invention.

FIG. 3 is a three-phase circuit diagram depicting active injection mode filter 117 in accordance with one embodiment of the present invention. Active injection mode filter 117 is connected to a three-phase AC power system. As illustrated in FIG. 3, three-phase AC power source 110 is connected to three-phase, three-wire AC load 112 by power line 111. Three-phase power line 111 includes conductors 111a, 111b and 111c. AC power source 110 provides line-to-ground voltages $V_{1a}$, $V_{1b}$ and $V_{1c}$ on conductors 111a, 111b and 111c, respectively. In a typical 480 volt line-to-line power distribution system, the line-to-ground voltages $V_{1a}$, $V_{1b}$ and $V_{1c}$ are approximately 277 volts. Active current injection device 117 is connected to conductors 111a, 111b and 111c of power line 111 at nodes 113a, 113b and 113c, respectively.

Active current injection device 117 includes impedances 131a, 131b and 131c, three-phase transconductance power amplifier 118, line voltage sensing circuit 122, power supply means 124, current pump control circuits 132a and 132c, compensation circuits 133a and 133c, passive filter 128, sensors 115a and 115c, current injection signal generator 116, and summing junctions 130a, 130c, 134a and 134c.

Three-phase transconductance power amplifier 118 includes pulse width modulation control circuit 139, three-phase power switching bridge assembly 148, DC bus voltage control circuit 146, transducers 145a and 145c, impedances 121a–121c, amplifiers 136a and 136c, attenuator circuits 144a and 144c and summing nodes 135a, 135c, 137a, 137c and 138.

Transconductance amplifier 118 generates three output injection currents, $I_{1a}$, $I_{1b}$ and $I_{1c}$, in response to two input voltage signals received from summing nodes 134a and 134c. The three output injection currents, $I_{1a}$, $I_{1b}$ and $I_{1c}$, are transmitted from transconductance amplifier 118, through impedances 131a, 131b and 131c, respectively, to nodes 113a, 113b and 113c, respectively. Output injection currents $I_{1a}$, $I_{1b}$ and $I_{1c}$ each include several current components, including fundamental frequency components and non-fundamental frequency components. These output injection current components are discussed later in more detail.

Transconductance amplifier 118 receives input voltage signals from summing nodes 134a and 134c which are representative of the desired output injection currents $I_{1a}$, $I_{1b}$ and $I_{1c}$ on output leads 260a, 260b and 260c, respectively. The input voltage signals are described in more detail later in the specification.

The input voltage signal from summing node 134a, which is representative of the desired output injection current $I_{1a}$, is transmitted through summing node 135a, amplifier 136a and summing node 137a to input lead 247a of pulse width modulation control circuit 139. Similarly, the input voltage signal from summing node 134c, which is representative of the desired output injection current $I_{1c}$, is transmitted through summing node 135c, amplifier 136c and summing node 137c to input lead 247c of pulse width modulation control circuit 139. The outputs of summing nodes 137a and 137c are combined in summing node 138 to form a third input voltage signal which is equal to the negative sum of the outputs of summing nodes 137a and 137c. This third input voltage signal is provided to pulse width modulation control circuit 139 on input lead 247b.

The pulse width modulation control circuit 139 provides drive signals to power switching bridge assembly 148 on leads 240a–240f. In response, power switching bridge assembly 148 generates output injection currents $I_{1a}$, $I_{1b}$ and $I_{1c}$ on leads 260a, 260b and 260c, respectively.

The output injection currents from power switching bridge assembly 148 are controlled by a current control negative feedback loop formed by using transducers 145a and 145c (which are coupled to output leads 260a and 260c, respectively) to provide signals representative of output injection currents $I_{1a}$ and $I_{1c}$ to the negative inputs of summing nodes 135a and 135c, respectively. Because the current control feedback loop has finite gain, transconductance amplifier 118 performs like an ideal transconductance amplifier with an effective parallel impedance $Z_A$.

The output injection currents $I_{1a}$, $I_{1b}$ and $I_{1c}$ on leads 260a, 260b and 260c are filtered by output inductors 121a, 121b and 121c and shunt passive filter 128 to remove switching frequency components generated by power switching bridge circuit 148. Consequently, the output injection currents $I_{1a}$ and $I_{1c}$ are proportional to the voltage signals received on input leads 248a and 248c, respectively, and $I_{1b} = -(I_{1a} + I_{1c})$.

Summing nodes 137a and 137c also receive input signals from attenuating circuits 144a and 144c, respectively. Attenuator circuits 144a and 144c receive input signals from leads 160a and 160c of line voltage sensor 122. As discussed later, the voltages $V_{an}$ and $V_{cn}$ on leads 160a and 160c are representative of the line-to-neutral voltages $V_{1an}$ and $V_{1cn}$ at nodes 113a and 113c, respectively. The output of attenuator circuits 144a and 144c are line voltage feed forward signals inside the current control feedback loop that reduce the necessary loop gain of the current control feedback loop, thereby improving control over the output injection currents $I_{1a}$, $I_{1b}$ and $I_{1c}$ and increasing the stability of the feedback loop. In the prior art, where the output of the transconductance amplifier was connected directly to the AC power line, the required effect of the voltage feed forward was significant. In the present invention, however, the output of transconductance amplifier 118 sees little or none of the AC power line voltage as a result of the voltage drops across impedances 131a–131c. Consequently, the amount of voltage feed forward needed is substantially reduced. In other embodiments, attenuator circuits 144a and 144c are eliminated, thereby eliminating the voltage feed forward signals.

Figure 4:
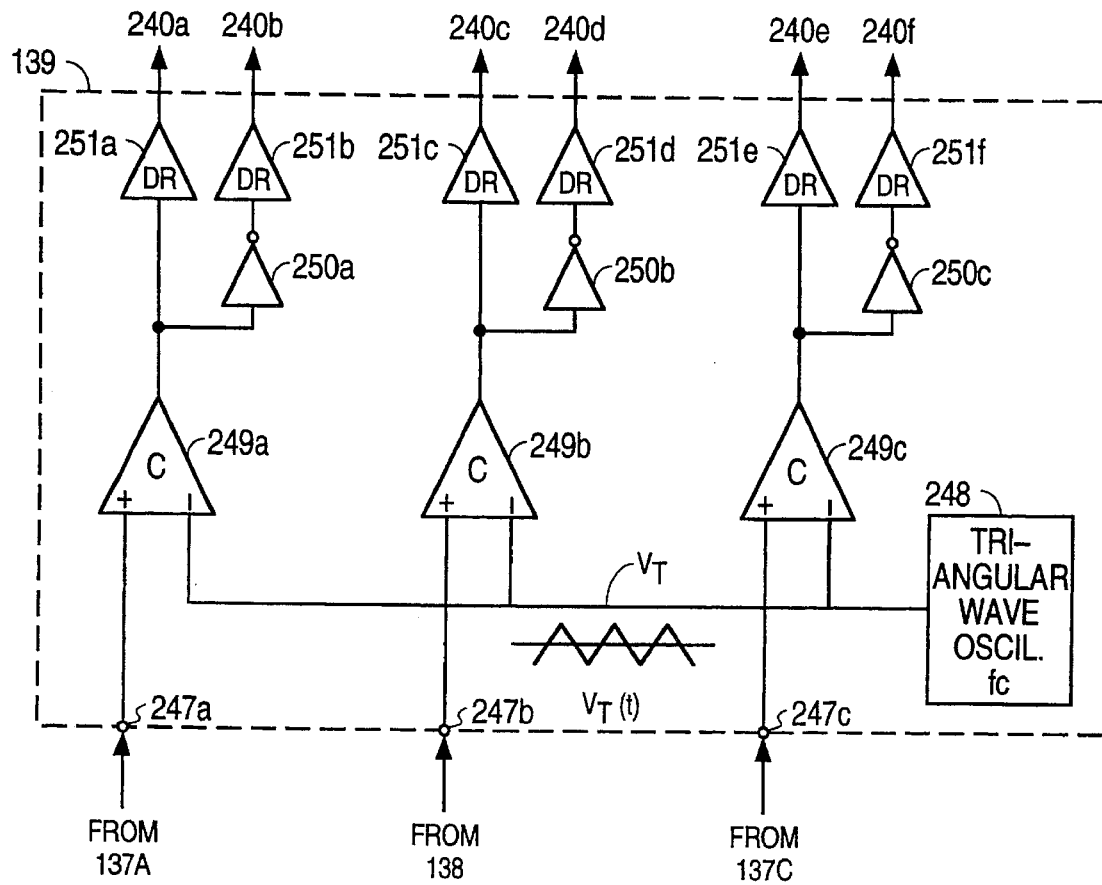
FIG. 4 is a circuit diagram of one embodiment of a pulse width modulation control circuit.

FIG. 4 is a circuit diagram of one embodiment of pulse width modulation control circuit 139. Triangular wave oscillator 248 generates a triangular wave voltage $V_T$ at a frequency $f_c$. The frequency $f_c$ is typically 20 kHz, which is approximately 10 times the highest frequency component to be generated by the transconductance amplifier 118. Triangular wave $V_T$ is applied to the inverting inputs of analog comparators 249a–249c. The outputs of summing nodes 137a, 138 and 137c are applied to the non-inverting inputs of analog comparators 249a, 249b and 249c, respectively. The two-state output signals of comparators 249a, 249b and 249c are routed through inverters 250a–250c and drive circuits 251a–251f, thereby producing drive signals on leads 240a–240f. The drive signals on leads 240a–240f are provided to power switching bridge circuit 148.

Figure 5:
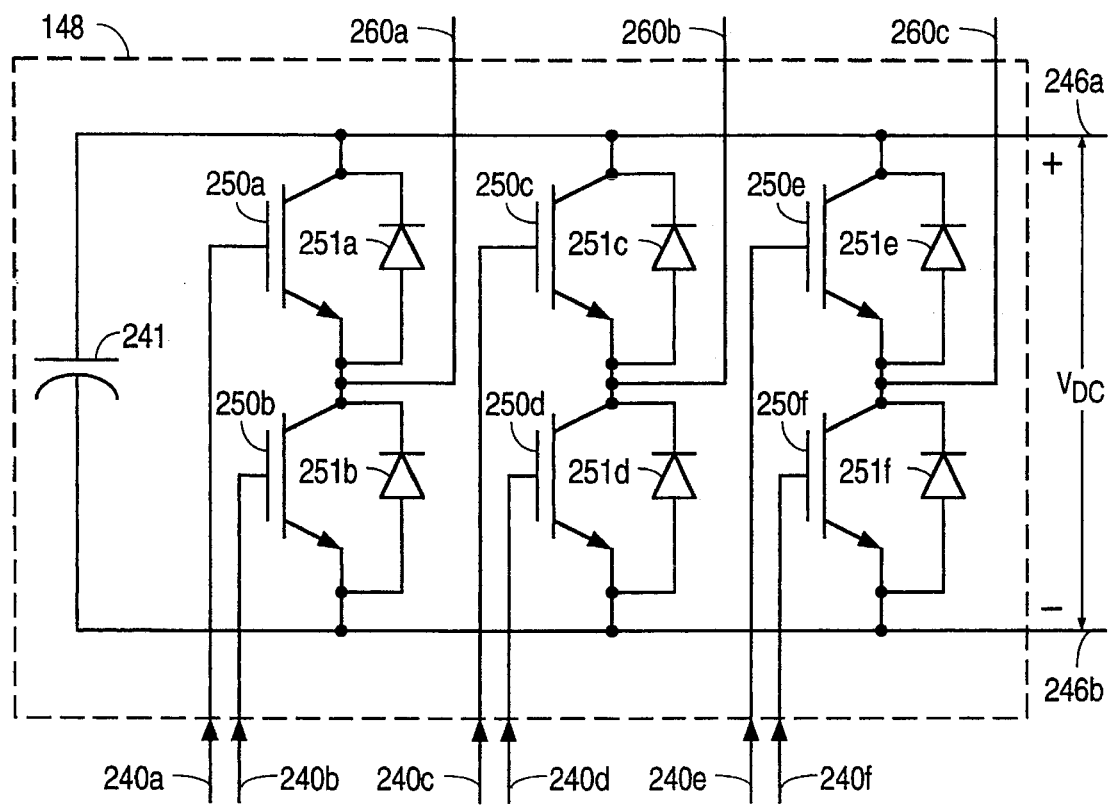
FIG. 5 is a circuit diagram illustrating one embodiment of a power switching bridge circuit.

FIG. 5 is a circuit diagram illustrating one embodiment of power switching bridge circuit 148. The signals on leads 240a–240f are provided to the bases of power semiconductor switches 250a–250f, respectively. Diodes 251a–251f are connected between the collectors and emitters of switches 250a–250f, respectively. The collectors of switches 250a, 250c and 250e are connected to the positive DC bus 246a. The emitters of switches 250a, 250c and 250e are connected to the collectors of switches 250b, 250d and 250f, respectively and to output leads 260a, 260b and 260c, respectively. The emitters of switches 250b, 250d and 250f are connected to the negative DC bus 246b. Capacitor 241 is connected between DC buses 246a and 246b. A DC voltage $V_{DC}$, exists between DC buses 246a and 246b.

The signals applied to leads 240a–240f open and close switches 250a–250f to connect the output leads 260a–260c to either DC bus 246a or DC bus 246b, thereby causing output injection currents $I_{1a}$, $I_{1b}$ and $I_{1c}$ to flow on leads 260a–260c.

Line voltage sensing circuit 122 receives line-to-ground voltages $V_{1a}$, $V_{1b}$ and $V_{1c}$ from nodes 113a–113c, respectively. In response, line voltage sensing circuit 122 provides two output signals $V_{an}$ and $V_{cn}$ on leads 160a and 160c, respectively. The output signals $V_{an}$ and $V_{cn}$ are used to control various circuits within active current injection device 117. $V_{an}$ is proportional to $V_{1a} - V_n$ and $V_{cn}$ is proportional to $V_{1c} - V_n$, where $V_n$ is equal to $(V_{1a} + V_{1b} + V_{1c})/3$. Thus, $V_n$ is representative of a neutral-to-ground voltage for power line 111 and $V_{an}$ and $V_{cn}$ are representative of line-to-neutral voltages $V_{1an}$ and $V_{1cn}$ of conductors 111a and 111c, respectively. Line-to-neutral voltage $V_{1bn}$ is equal to $-(V_{1an}+V_{1cn})$.

Figure 6:
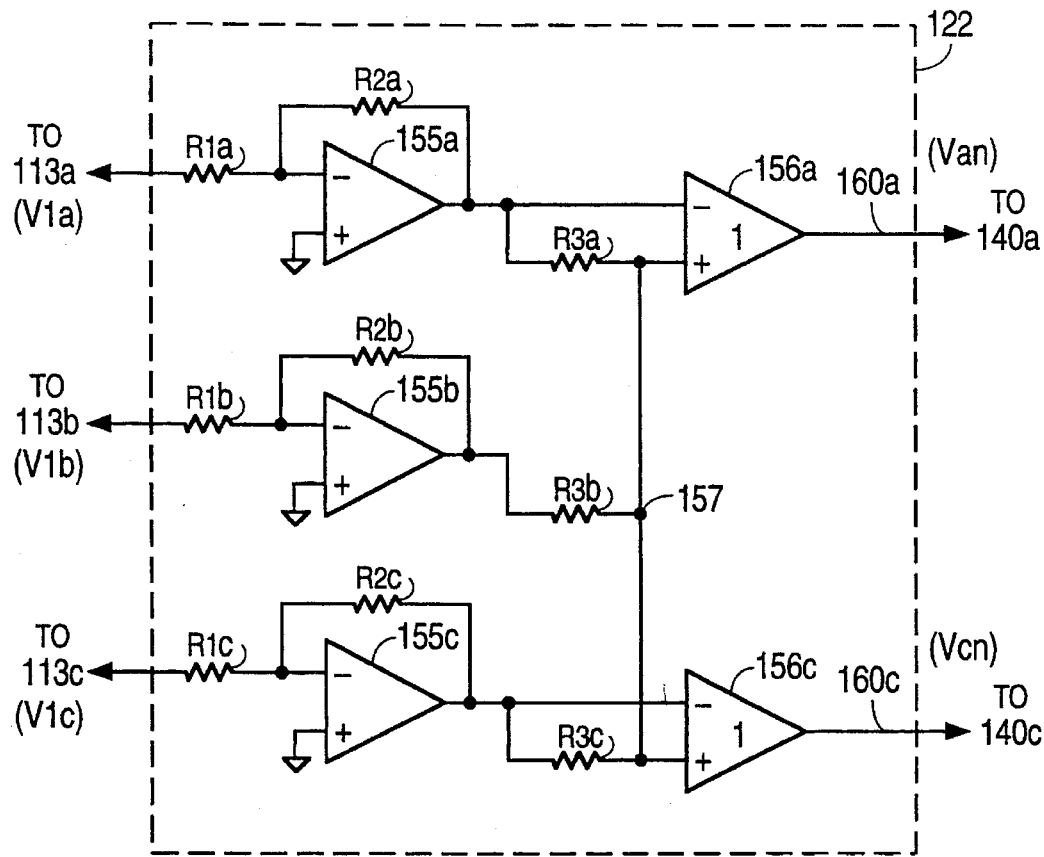
FIG. 6 is a circuit diagram of one embodiment of a line voltage sensing circuit.

FIG. 6 is a circuit diagram of one embodiment of line voltage sensing circuit 122. Line-to-ground voltage $V_{1a}$ from node 113a is applied to the inverting attenuator consisting of attenuation control resistors R1a and R2a and operational amplifier 155a. Similarly, line-to-ground voltage $V_{1b}$ from node 113b is applied to the inverting attenuator consisting of resistors R1b and R2b and operational amplifier 155b, and line-to-ground voltage $V_{1c}$ from node 113c is applied to the inverting attenuator consisting of resistors R1c and R2c and operational amplifier 155c. In one embodiment, resistors R1a, R1b and R1c all have the same resistance and resistors R2a, R2b and R2c all have the same resistance.

The outputs of operational amplifiers 155a, 155b and 155c are transmitted through equal-value resistors R3a, R3b and R3c, respectively, to node 157. The voltage on node 157 is equal to the average of the voltages on the outputs of operational amplifiers 155a, 155b and 155c. Node 157 and the output of operational amplifier 155a are connected to the non-inverting and inverting inputs, respectively, of unity-gain differential amplifier 156a to produce output signal $V_{an}$ on lead 160a. Similarly, node 157 and the output of operational amplifier 155c are connected to the non-inverting and inverting inputs, respectively, of unity-gain differential amplifier 156c to produce output signal $V_{cn}$ on lead 160c. As previously discussed, $V_{an}$ and $V_{cn}$ are representative of the line-to-neutral voltages $V_{1an}$ and $V_{1cn}$ on nodes 113a and 113c, respectively.

Figure 7:
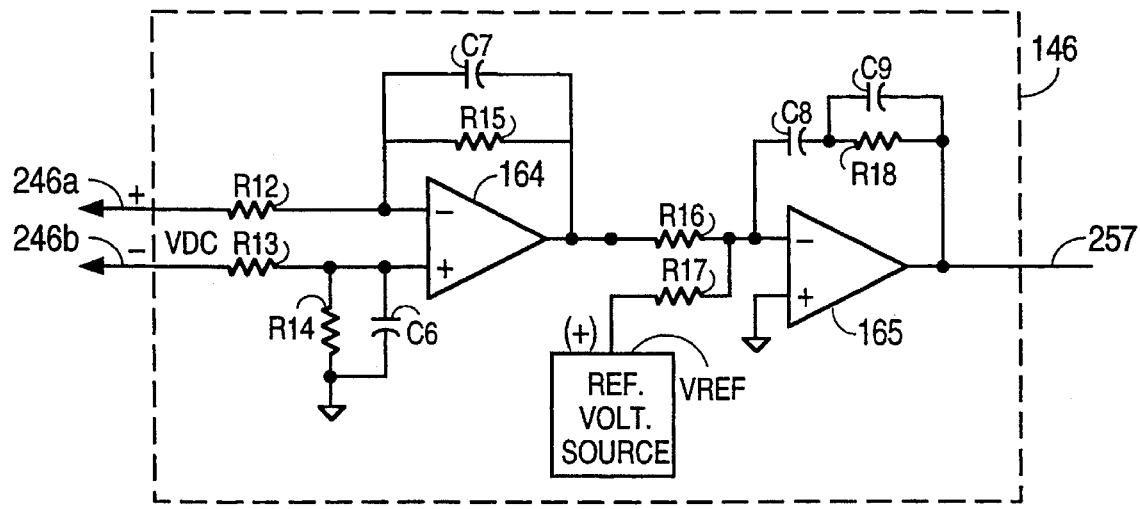
FIG. 7 is a circuit diagram illustrating circuitry within a DC bus control circuit.

FIG. 7 is a circuit diagram illustrating circuitry within DC bus control circuit 146 in accordance with one embodiment of the present invention. DC bus control circuit 146 cooperates with power supply means 124 to control the voltage $V_{DC}$ across storage capacitor 241 in the power switching bridge assembly (i.e. the voltage between the positive DC bus 246a and the negative DC bus 246b in that assembly), thereby providing the power necessary to operate power switching bridge assembly 148.

DC bus control circuit 146 uses operational amplifier 164 in conjunction with resistors R12–R15 and capacitors C6 and C7, to form a high-rejection common-mode amplifier to produce an output signal proportional to $V_{DC}$. This output signal is provided to the inverting input of operational amplifier 165 through resistor R16. Voltage reference source 166 provides to the inverting input of operational amplifier 165 through resistor R17 a signal representative of the desired value of $V_{DC}$. Resistor R18 and capacitors C8 and C9 are connected across the inverting input and the output of operational amplifier 165, thereby creating an amplifier having an output proportional to the difference between the voltage from operational amplifier 164, which is representative of $V_{DC}$ and the voltage from voltage reference source 166, which is representative of the desired value of $V_{DC}$. Thus, if the voltage $V_{DC}$ is equal to the desired value, the output on lead 257 is zero. If $V_{DC}$ is less than the desired value, the output signal on lead 257 is less than zero. Conversely, if $V_{DC}$ is greater than the desired value, the output signal on lead 257 is greater than zero. Lead 257 is connected to multipliers 142a and 142c of power supply means 124.

In response to the output signal on lead 257 and the voltages $V_{an}$ and $V_{cn}$ from line voltage sensing circuit 122, power supply means 124 causes transconductance amplifier 118 to generate a current component at the fundamental frequency to maintain the desired voltage $V_{DC}$ between DC buses 246a and 246b. This current component is normally opposite in phase to the power line voltage at nodes 113a–113c, thereby causing power to flow from nodes 113a–113c to the DC buses 246a and 246b through impedances 131a–131c, inductors 121a–121c and semiconductor power switches 250a–250f to maintain the desired DC bus voltage across DC buses 246a and 246b.

Figure 8:
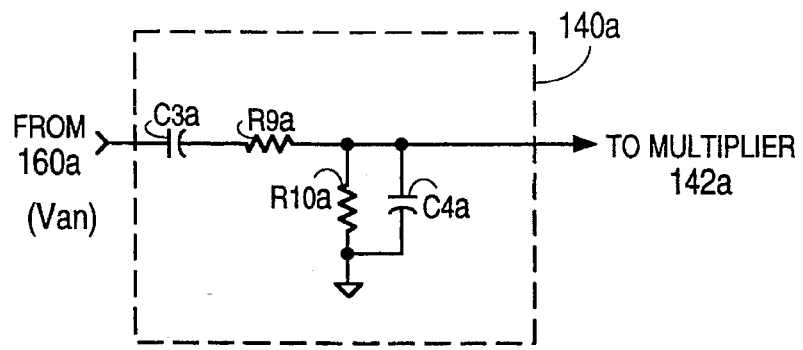
FIG. 8 is a circuit diagram of one embodiment of a band-pass filter.

Power supply means 124 includes band-pass filters 140a and 140c and multipliers 142a and 142c (FIG. 3). Leads 160a and 160c of line voltage sensing circuit 122 are connected to the inputs of band-pass filters 140a and 140b, respectively. Band-pass filters 140a and 140c pass the fundamental frequency components of voltages $V_{an}$ and $V_{cn}$, respectively, to multipliers 142a and 142c, respectively. Band-pass filters 140a and 140c are conventional filters. FIG. 8 is a circuit diagram of one embodiment of band-pass filter 140a. In this embodiment, band-pass filter 140a is identical to band-pass filter 140c. The values of resistors R9a and R10a and capacitors C3a and C4a are selected to produce zero phase shift at the fundamental frequency and attenuation at non-fundamental frequencies.

Multipliers 142a and 142c also receive the output of DC bus voltage controller 146 on lead 257. As previously discussed, the output of DC bus voltage controller 146 is a voltage representative of the difference between the desired voltage across DC buses 246a and 246b and the actual voltage $V_{DC}$ between DC buses 246a and 246b (i.e. across storage capacitor C241). If this difference is zero, the outputs of multipliers 142a and 142c are also zero, and power supply means 124 does not cause any power to flow from nodes 113a–113c to the DC buses 246a and 246b. However, if the output of DC bus control circuit 146 indicates that the voltage $V_{DC}$ is less than the desired value, multipliers 142a and 142c generate voltage signals at the fundamental frequency which are opposite in phase to the fundamental frequency components of power line voltages $V_{1an}$ and $V_{1cn}$. The outputs of multipliers 142a and 142c are provided to transconductance amplifier 118 through summing nodes 130a and 130c, respectively, and compensation blocks 133a and 133c, respectively. In response, transconductance amplifier 118 generates current components of currents $I_{1a}$, $I_{1b}$ and $I_{1c}$ at the fundamental frequency which results in a flow of power from power line 111 to capacitor 241 which increases the voltage $V_{DC}$.

Conversely, if the output of DC bus control circuit 146 indicates that the voltage $V_{DC}$ is greater than the desired value, multipliers 142a and 142c generate voltage signals at the fundamental frequency which are in phase with the fundamental frequency components of power line voltages $V_{1an}$ and $V_{1cn}$. Under these circumstances, the outputs of multipliers 142a and 142c cause transconductance amplifier 118 to generate current components of currents $I_{1a}$, $I_{1b}$ and $I_{1c}$ at the fundamental frequency resulting in a flow of power from capacitor 241 to power line 111, thereby discharging capacitor 241 and decreasing $V_{DC}$.

The output signals $V_{an}$ and $V_{cn}$ on leads 160a and 160c of line voltage sensing circuit 122 are also provided to current pump control circuits 132a and 132c. Current pump control circuits 132a and 132c generate voltage signals proportional to the fundamental frequency components of voltages $V_{1an}$ and $V_{1cn}$, respectively, but lagging in phase by 90 degrees. These lagging voltage signals are provided to transconductance amplifier 118, resulting in the generation of components of currents $I_{1a}$, $I_{1b}$ and $I_{1c}$ which lag the line voltages $V_{1an}$, $V_{1bn}$ and $V_{1cn}$ by 90 degrees. These lagging currents result in corresponding voltage drops across impedances 131a–131c which are approximately equal to the fundamental frequency voltage components of the line voltage. As previously discussed, these voltage drops reduce the required DC operating voltage $V_{DC}$ of the power switching bridge assembly 148 and supply leading current to power line 111. It is preferred that $V_{DC}$ be less than 600 Volts, thereby allowing the use of less inexpensive switching transistors and reducing switching losses.

The output voltages of current pump controls 132a and 132c are selected so that $$I_{1aCP} * Z_{Pa} \approx V_{1an},$$

$$I_{1bCP} * Z_{Pb} \approx V_{1bn}, \text{ and}$$

$$I_{1cCP} * Z_{Pc} \approx V_{1cn}.$$

In the above listed equations, $I_{1aCP}$, $I_{1bCP}$ and $I_{1cCP}$ are the components of output injection currents $I_{1a}$, $I_{1b}$ and $I_{1c}$, respectively, which are generated by transconductance amplifier 118 in response to the output voltage signals of current pump controls 132a and 132c. $Z_{Pa}$, $Z_{Pb}$ and $Z_{Pc}$ are the respective impedances of impedances 131a, 131b and 131c at the fundamental frequency, and $V_{1an}$, $V_{1bn}$ and $V_{1cn}$ are the line-to-neutral voltages of power line 111 at respective nodes 113a, 113b and 113c.

In one embodiment impedances 131a, 131b and 131c are matched impedance capacitors. In other embodiments, impedances 131a–131c are capacitors and inductors connected in parallel.

Figure 9:
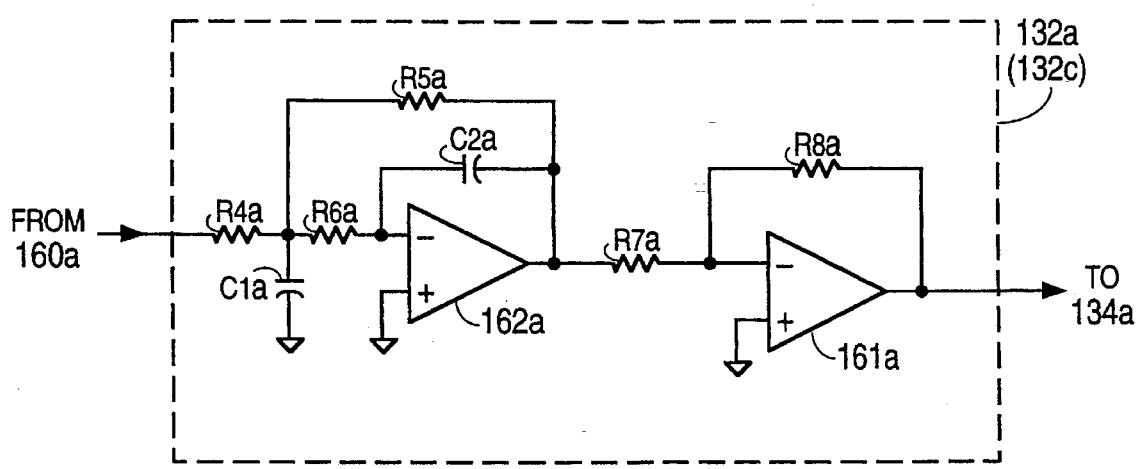
FIG. 9 is a circuit diagram of one embodiment of a current pump control circuit.

FIG. 9 is a circuit diagram of one embodiment of current pump control circuit 132a. In this embodiment, current pump control circuit 132c is identical to current pump control circuit 132a. Lead 160a couples the $V_{an}$ output of line voltage sensing circuit 122 to the input of a two-pole analog active filter circuit consisting of operational amplifier 162a, resistors R4a–R6a, and capacitors C1a and C2a. The values of resistors R4a–R6a and capacitors C1a and C2a are chosen such that the output of operational amplifier 162a has a phase shift of positive 90 degrees with respect to the $V_{an}$ signal. The two-pole analog filter circuit also provides substantial attenuation for non-fundamental frequencies, such that the output of the filter circuit is proportional to the fundamental frequency component of $V_{an}$. Operational amplifier 161a in conjunction with resistors R7a and R8a inverts the output of operational amplifier 162a to produce an output voltage which, because of the inversion, has a 90 degree phase lag with respect to the $V_{an}$ signal. The values of resistors R4a–R8a and capacitors C1a–C2a are selected such that the above-listed requirements are satisfied.

Current injection signal generator 116 has two functions in the embodiment illustrated in FIG. 3. The first function is to generate voltage signals which are ultimately provided to transconductance amplifier 118 to create non-fundamental frequency current components of output currents $I_{1a}$, $I_{1b}$ and $I_{1c}$. The generated non-fundamental frequency current components are equal to the non-fundamental frequency components drawn by load 112. Consequently, the non-fundamental frequency current components of load 112 are not drawn from AC power source 110.

However, when the non-fundamental frequency current components flowing to load 112 exist because of non-fundamental frequency voltages on AC power line 111, and not because of non-linearity of load 112, the first function by itself unloads the non-fundamental frequency voltages from AC power line 111, resulting in an increase in the amplitude of non-fundamental frequency voltages in other equipment (not shown) connected to the power system. When load 112 contains capacitive elements, the first function can cause system instability.

Hence, the second function of current injection signal generator 116 is to counteract the unloading of non-fundamental frequency voltages and resulting instability. This second function is performed by using damping control circuits within current injection signal generator 116 to generate voltage signals which are ultimately provided to transconductance amplifier 118 to create non-fundamental frequency current components of output injection currents $I_{1a}$, $I_{1b}$ and $I_{1c}$. These non-fundamental frequency current components are approximately opposite in phase to the power line voltages $V_{1an}$, $V_{1bn}$ and $V_{1cn}$ and thereby load the non-fundamental frequency voltage components of these voltages.

Figure 10:
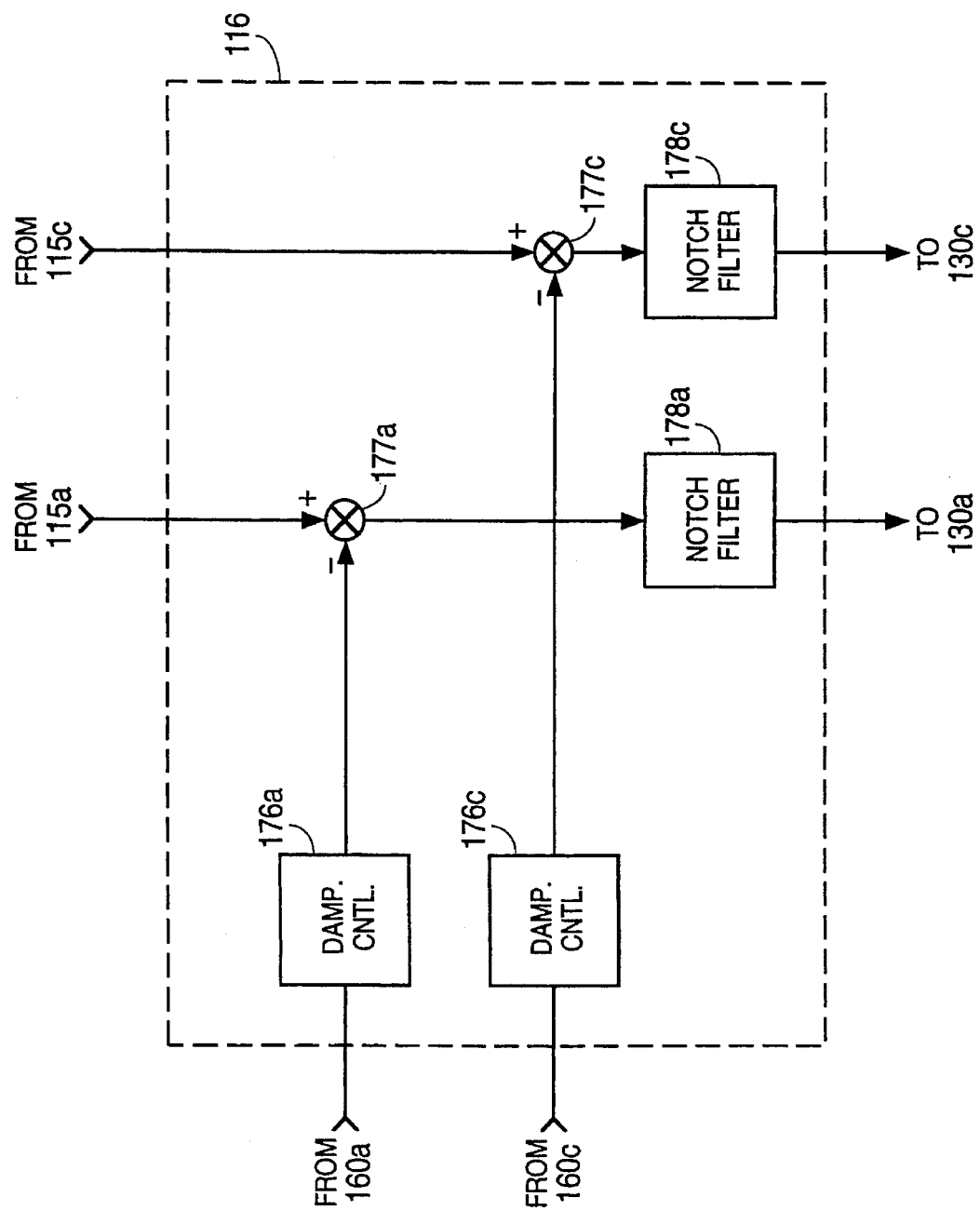
FIG. 10 is a block diagram of one embodiment of a current injection control circuit.

FIG. 10 is a block diagram of one embodiment of current injection control circuit 116. Current transducers 115a and 115c sense the currents on conductors 111a and 111c, respectively, and provide signals representative of these currents to positive inputs of summing nodes 177a and 177c, respectively. Damping control circuits 176a and 176c receive input signals $V_{an}$ and $V_{cn}$ from leads 160a and 160c of line voltage sensor 122. The outputs of damping control circuits 176a and 176c are representative of electronic loadings which are created for the non-fundamental frequency voltage components of voltages $V_{1n}$ and $V_{1n}$. The outputs of damping circuits 176a and 176c are provided to negative inputs of summing nodes 177a and 177c, respectively.

Figure 11:
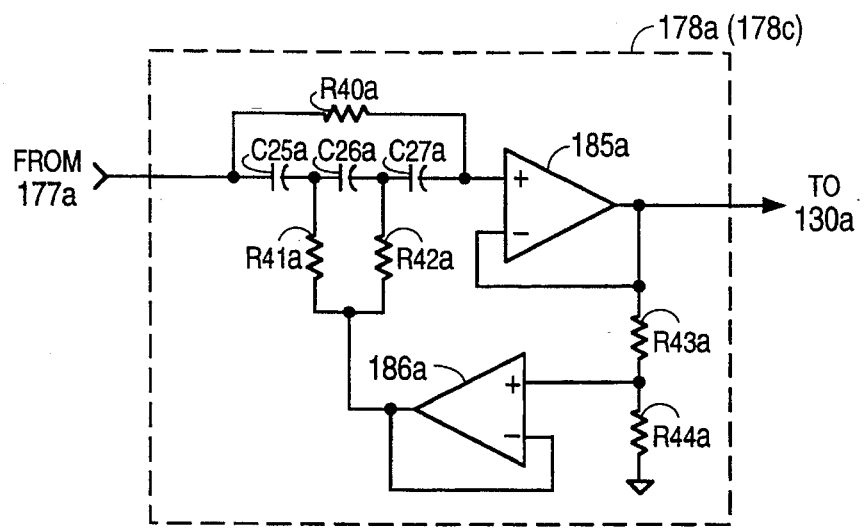
FIG. 11 is a circuit diagram of one embodiment of a notch filter.

The outputs of summing nodes 177a and 177c are provided to inputs of notch filters 178a and 178c, respectively. Notch filters 178a and 178c filter the signals from summing nodes 177a and 177c, respectively, to remove the fundamental frequency component. FIG. 11 is a circuit diagram illustrating one embodiment of notch filter 178a. In this embodiment, notch filter 178c is identical to notch filter 178a. Notch filter 178a is a conventional circuit which uses operational amplifiers 185a and 186a and resistors R43a and R44a to provide positive feedback to the "T" element of the notch filter formed by capacitors C25a–C27a and resistors R40a–R42a. The outputs of notch filters 178a and 178c are provided to summing nodes 130a and 130c, respectively on leads 170a and 170c, respectively.

The signals from sensors 115a and 115c perform the first function of current injection signal generator 116 described above. The signals from damping control circuits 176a and 176c perform the second function of the current injection signal generator 116.

Figure 12:
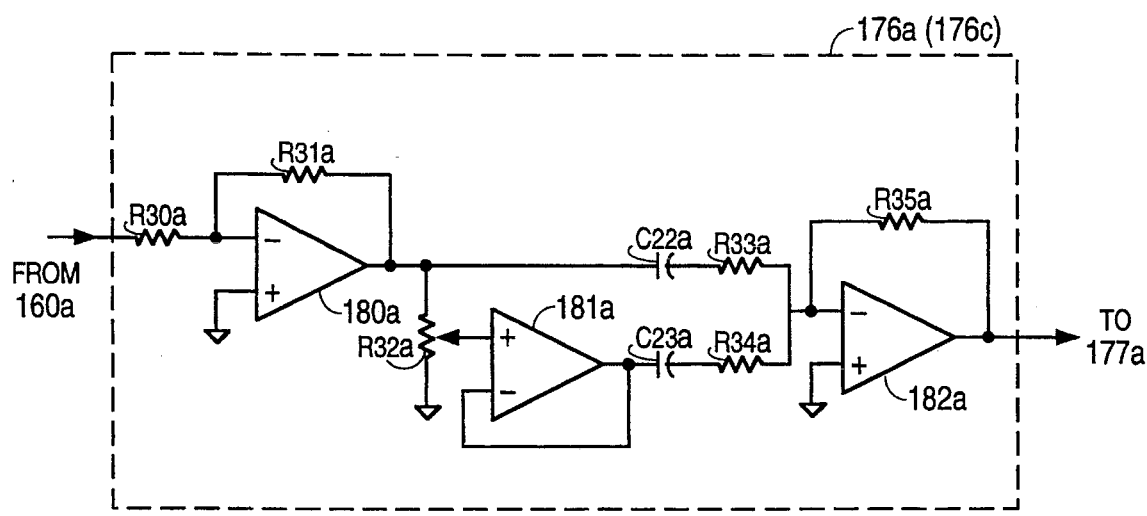
FIG. 12 is a circuit diagram of one embodiment of a damping control circuit.

FIG. 12 is a circuit diagram illustrating one embodiment of damping control circuit 176a. In this embodiment, damping control circuit 176c is identical to damping circuit 176a. The input voltage signal $V_{an}$ on lead 160a is inverted by the inverter formed by operational amplifier 180a and resistors R30a and R31a. The output of operational amplifier 180a is provided to the inverting input of operational amplifier 182a through a high pass filter formed by capacitor C22a and resistor R33a. Resistor R33a and capacitor C22a are selected so that at the frequencies of interest (i.e., 100 to 2000 Hz), the impedance of resistor R33a is much larger than the impedance of capacitor C22a, such that the effects of resistor R33a dominate. In one embodiment, the time constant of the high pass filter formed by capacitor C22a and resistor R33a is approximately 1 msec.

The output of operational amplifier 180a is also provided to the inverting input of operational amplifier 182a through variable resistor R32a, operational amplifier 181a, and a high pass filter formed by capacitor C23a and resistor R34a. Resistor R34a and capacitor C23a are selected so that at the frequencies of interest, the impedance of capacitor C23a is much larger than the impedance of resistor R34a, such that the effects of capacitor C23a dominate. In one embodiment, the time constant of the high pass filter formed by capacitor C23a and resistor R34a is approximately 0.1 msec.

Resistor R35a is connected to the inverting input and the output of operational amplifier 182a. The output of operational amplifier 182a is a voltage signal with two components. The first component, which is proportional to line voltage $V_{1an}$, results from applying a voltage across resistor R33a. The second component, which is proportional to the rate of change of line voltage $V_{1an}$, results from applying a voltage across capacitor C23a.

The fundamental frequency components of the outputs of damping control circuits 176a and 176c are removed by notch filters 178a and 178c, thereby transmitting the non-fundamental frequency components of these outputs through compensation blocks 133a and 133c to transconductance amplifier 118. In response, transconductance amplifier 118 generates non-fundamental frequency current components of $I_{1a}$, $I_{1b}$ and $I_{1c}$ which are a function of, and approximately opposite in phase with respect to, the non-fundamental frequency voltage components of the line voltages $V_{1an}$, $V_{1bn}$ and $V_{1cn}$. Thus, for each volt of non-fundamental frequency voltage present on power line 111, damping control circuits 176a and 176c cause active current injection device 117 to draw a frequency-dependent non-fundamental frequency current. In this manner, damping control circuits 176a and 176c create an electronic load, $Z_E$, for non-fundamental frequency voltages. Electronic load $Z_E$ has two components, $Z_R$ and $Z_C$, where $Z_R$ is a resistive component determined by the resistor R35a and $Z_C$ is a capacitive component determined by capacitor C23a.

Because active current injection device 117 also generates the non-fundamental frequency currents required by load 112, the equivalent impedance of active current injection device 117 and load 112 at non-fundamental frequency voltages is equal to $Z_E$. Thus, unlike prior art AIM filters, active current injection device 117 does not unload the non-fundamental frequency voltages. Consequently, the increased non-fundamental and frequency voltages and instability experienced by prior art AIM filters is eliminated.

In one embodiment of the present invention, the electronic load $Z_E$ is selected to approximate the impedance $Z_L$ of the linear elements of load 112 at non-fundamental frequencies. To set $Z_E$ equal to $Z_L$, the value of resistor R33a of damping control circuit 176a is selected to correspond to the resistive component of $Z_L$ and the value of capacitor C23a of damping control circuit 176a is set to correspond to the capacitive component of $Z_L$. If $Z_L$ has no capacitive component, variable resistor R32a of damping control circuit 176a is set to ground the input to capacitor C23a and avoid instabilities.

The outputs of current injection control circuit 116 (i.e. the outputs of notch filters 178a and 178c) are added to the outputs of power supply means 124 (i.e. the outputs of multipliers 142a and 142c, respectively) at summing nodes 130a and 130c, respectively. The outputs of summing nodes 130a and 130c are provided to inputs of compensation circuits 133a and 133c, respectively.

Compensation circuits 133a and 133c provide amplitude and phase correction to the outputs of nodes 130a and 130c to compensate for amplitude and/or phase shift in the output injection currents $I_{1a}$, $I_{1b}$ and $I_{1c}$ caused by impedances 131a, 131b and 131c.

The desired transfer function for compensation circuit 133a (or 133c) is given by $$Vout/Vin = (Z_P + Z_A)/Z_A$$

where $Z_P$ is the impedance of impedance 131a (or 131c) and $Z_A$ is the equivalent output shunt impedance of transconductance amplifier 118. Impedance 131a (or 131c) is typically a capacitor having a capacitance of $C_P$. As previously discussed, impedance $Z_A$ results from the finite gain of the current feedback loop of transconductance amplifier 118. At the frequencies at which compensation is required, $Z_A$ is principally resistive with a resistance of $R_A$. The impedances of inductors 121a–121c are small enough at the frequencies of interest to be ignored in determining the equivalent output shunt impedance $Z_A$ of transconductance amplifier 118.

Figure 13:
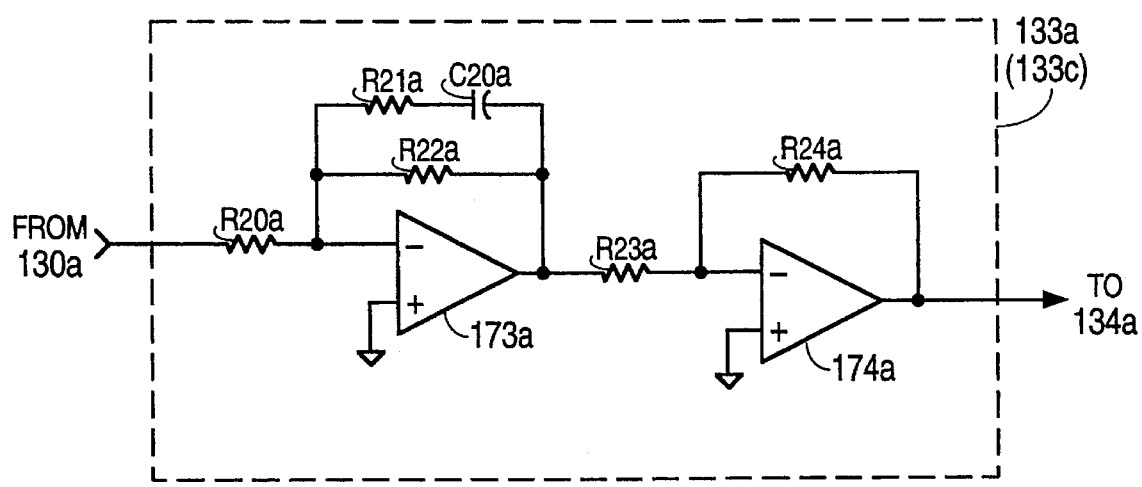
FIG. 13 is a circuit diagram of one embodiment of a compensation circuit.

FIG. 13 is a circuit diagram of one embodiment of compensation circuit 133a which provides the desired transfer function. In this embodiment, compensation circuit 133c is identical to compensation circuit 133a.

In compensation circuit 133a, the signal from summing node 130a is provided to an amplifying inverter formed by operational amplifier 173a, resistors R20a–R22a and capacitor C20a.

To provide the desired transfer function, the resistance of resistor R21a and the capacitance of capacitor C20a are chosen such that the time constant R21a * C20a is equal to the time constant $R_A$ * $C_P$. The resistance of resistor R20a is selected to correspond to the resistance of R21a. The value of resistor R22a is chosen to be large with respect to resistor R21a, and acts to limit the compensation at frequencies below the fundamental frequency.

The output of operational amplifier 173a is inverted by the inverter formed by operational amplifier 174a and resistors R23a and R24, thereby providing an output signal having the proper lagging phase. Given these circuit parameters, compensation circuit 133a provides the desired transfer function at the frequencies of interest (i.e., 100 to 2000 Hz) without providing excessive gain at frequencies less than the fundamental frequency of the AC power line.

The outputs of compensation circuits 133a and 133c are provided to positive inputs of summing nodes 134a and 134c, respectively, where they are added to the outputs of current pump controls 132a and 132c, respectively, and transmitted to transconductance amplifier 118.

Figure 14:
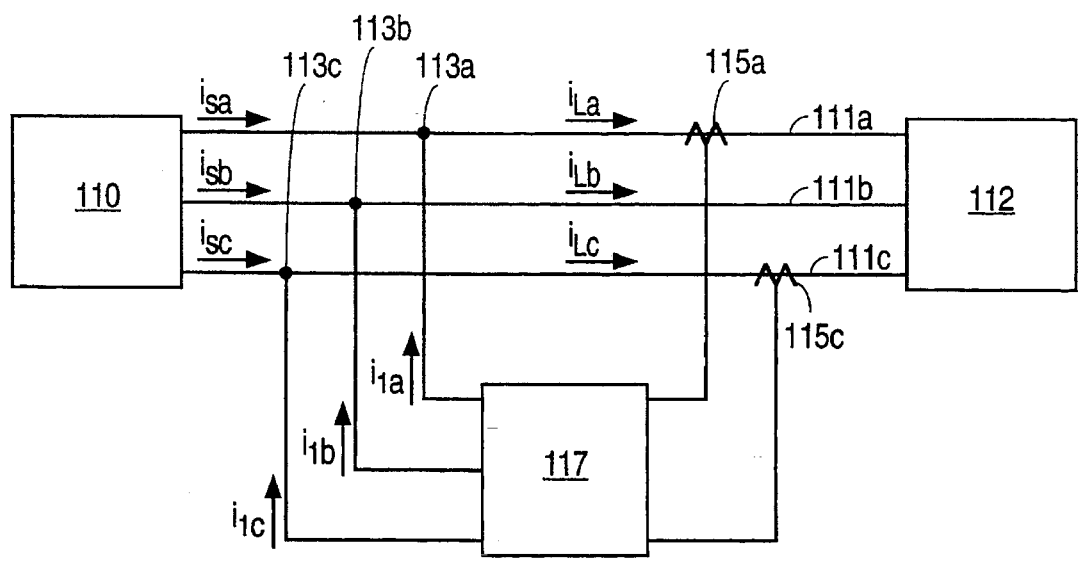
FIG. 14 is a block diagram illustrating non-fundamental frequency currents existing in the three-wire, three-phase power system.

FIG. 14 is a block diagram illustrating non-fundamental frequency currents existing in the three-wire, three-phase power system previously described in connection with active current injection device 117. The currents $i_{Sa}$, $i_{Sb}$ and $i_{Sc}$ represent the non-fundamental-frequency components of the currents flowing from source 110 to nodes 113a, 113b and 113c, respectively. Currents $i_{1a}$, $i_{1b}$ and $i_{1c}$ represent the non-fundamental-frequency components of the currents flowing from active current injection device 117 to nodes 113a, 113b and 113c, respectively. Currents $i_{La}$, $i_{Lb}$ and $i_{Lc}$ represent the non-fundamental-frequency components of the currents flowing to load 112 from nodes 113a, 113b and 113c, respectively. In such a power system, the following equations apply.

$$i_{Sa} + i_{Sb} + i_{Sc} = 0$$

$$i_{1a} + i_{1b} + i_{1c} = 0$$

$$i_{La} + i_{Lb} + i_{Lc} = 0$$

$$i_{Sa} = i_{La} - i_{1a}$$

$$i_{Sb} = i_{Lb} - i_{1b} \text{ and}$$

$$i_{Sc} = i_{Lc} - i_{1c}.$$

Using the inputs from transducers 115a and 115c, active current injection device 117 produces $i_{1a}$ and $i_{1c}$ such that, in the absence of non-fundamental frequency voltage components of line voltages $V_{1an}$, $V_{1bn}$ and $V_{1cn}$, $i_{1a}=i_{La}$ and $i_{1c}=i_{Lc}$, in which case, by the equations above, $i_{1b}=i_{Lb}$ and $i_{sa}=i_{sb}=i_{sc}=0$.

However, if the active current injection device 117 is coupled to a four-wire, three-phase system (with a neutral wire being the fourth wire) without modification, problems may arise. In a four-wire, three-phase system, the following equations apply:

$$i_{sa}+i_{sb}+i_{sc}=i_n,$$

$$i_{La}+i_{Lb}+i_{Lc}=i_n, \text{ and}$$

$$i_{1a}+i_{1b}+i_{1c}=0$$

where $i_n$ represents the non-fundamental-frequency components of the current flowing in the neutral wire. In this system, if the active current injection device 117 makes $i_{1a}=i_{La}$ and $i_{1c}=i_{Lc}$, then $i_{sa}$ and $i_{sc}$ equal 0 and $i_{sb}$ equals $i_n$, i.e., the total non-fundamental-frequency component of the neutral wire current flows through conductor 111b, thereby causing potential overheating in that conductor and in upstream power distribution transformers. Thus, in an alternate embodiment of the present invention, the active current injection device 117 as previously described is modified for use in a four-wire, three-phase power system.

Figure 15:
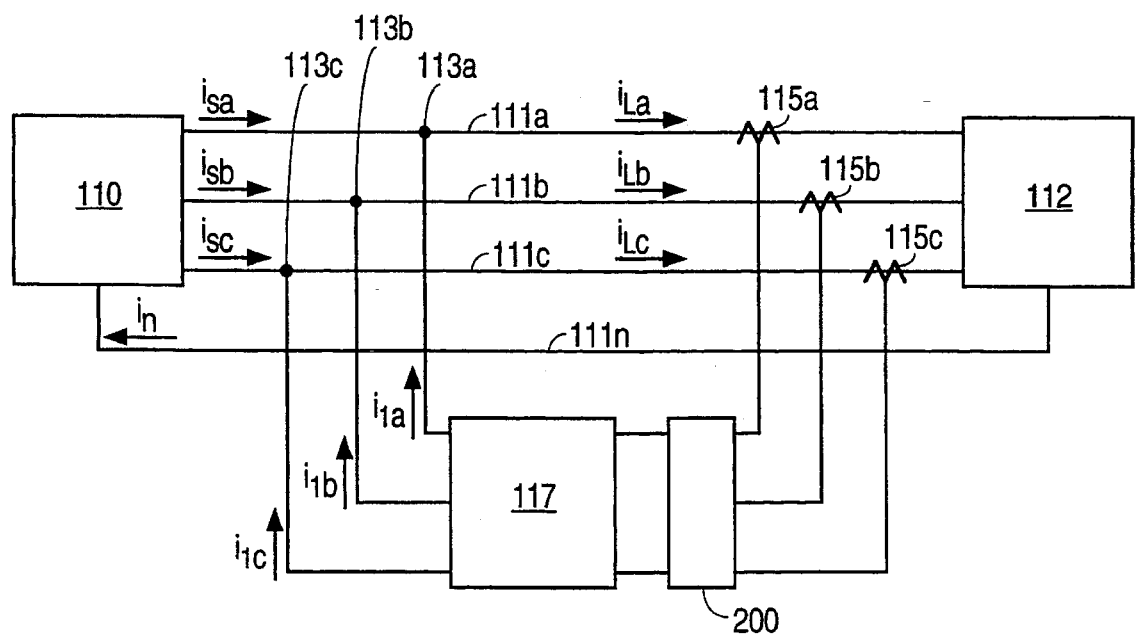
FIG. 15 is a block diagram showing connections of a four-wire adapter circuit in accordance with the present invention.

FIG. 15 is a block diagram showing the connection of a four-wire adapter circuit 200 for active current injection device 117. In the four-wire, three-phase embodiment, power line 111 includes neutral conductor 111n in addition to conductors 111a–111c. Neutral conductor 111n provides a return path for the non-fundamental frequency current component in from load 112 to power source 110. An additional transducer 115b is coupled to conductor 111b. Transducers 115a, 115b and 115c create signals whose non-fundamental frequency components are proportional to currents $i_{La}$, $i_{Lb}$ and $i_{Lc}$. Four-wire adapter circuit 200 receives these signals from transducers 115a, 115b and 115c.

Figure 16:
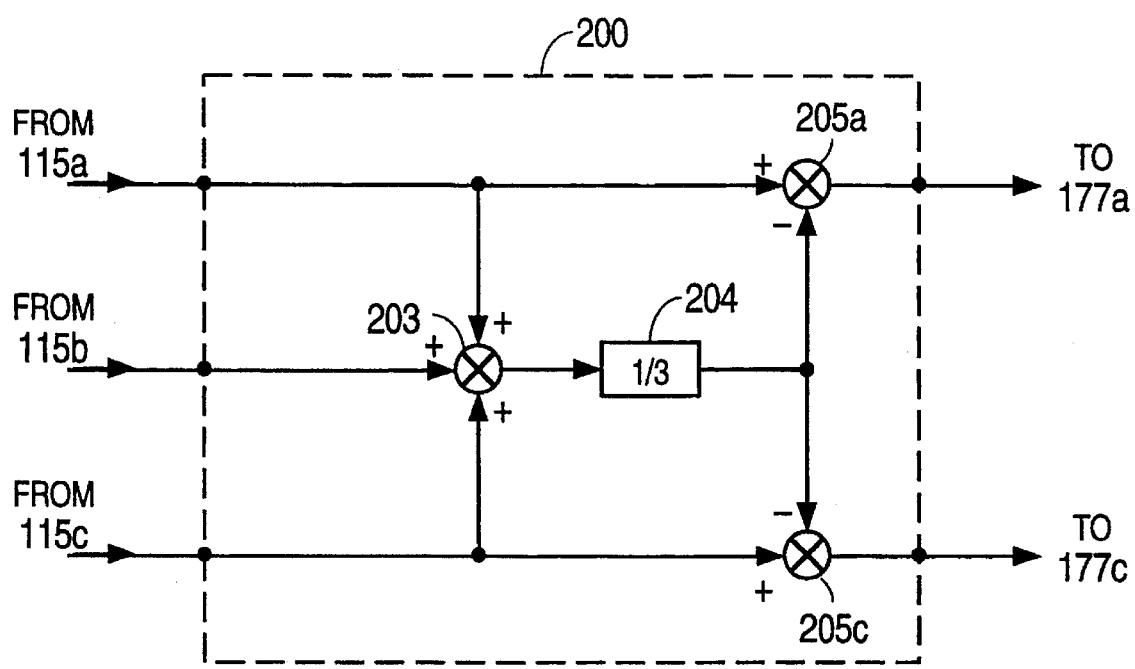
FIG. 16 is a schematic diagram of a four-wire adapter circuit for an active injection mode filter.

FIG. 16 is a schematic diagram of four-wire adapter circuit 200. The output of transducer 115a is provided to a positive input of summing node 205a and to a positive input of summing node 203. The output of transducer 115b is provided to a positive input of summing node 203. The output of transducer 115c is provided to a positive input of summing node 205c and a positive input of summing node 203. The output of summing node 203 is divided by three by attenuator circuit 204. The output of attenuator circuit 204 is provided to negative inputs of summing nodes 205a and 205c. Thus, the output of summing node 205a is proportional to $i_{La} - (\frac{1}{3} * i_n)$ and the output of summing node 205c is proportional to $i_{Lc} - (\frac{1}{3} * i_n)$.

The outputs of summing nodes 205a and 205c are provided to summing nodes 177a and 177c, respectively, of current injection control circuit 116 of active current injection device 117 (FIG. 10). These outputs are transmitted to transconductance amplifier 118 through notch filters 178a, 178c, compensation circuits 133a, 133c and summing nodes 130a, 130c, 134a and 134c (FIG. 3). In response, transconductance amplifier 118 generates non-fundamental frequency current component $i_{1a}$ which is equal to $i_{La} - (\frac{1}{3} * i_n)$ and non-fundamental frequency current component $i_{1c}$ which is equal to $i_{Lc} - (\frac{1}{3} * i_n)$. Based on the above-listed equations, non-fundamental frequency current component $i_{1b}$ is generated that is equal to $i_{Lb} - (\frac{1}{3} * i_n)$.

As a result, the non-fundamental frequency current components $i_{sa}$, $i_{sb}$ and $i_{sc}$ on lines 111a–111c are equal in phase and amplitude to one another and equal to one third of the non-fundamental frequency component in neutral line 111n. This is true even if the non-fundamental current components of load 112 are unbalanced (e.g., all of the non-fundamental current components are drawn by one of the three phases). By balancing the non-fundamental frequency current components as previously described, the potential for overheating upstream devices as a result of these current components is reduced.

Although the present invention has been described in accordance with certain embodiments, alternate embodiments are contemplated. For example, although the present invention has been described in accordance with a three-phase embodiment, modifications could easily be made to provide for a single phase embodiment.

Additionally, although the present invention has been described in an active injection mode embodiment, the present invention can be easily modified to operate in response to an independent signal generator. In such an embodiment, transducers 115a and 115c are disconnected from summing nodes 177a and 177c of current injection control circuit 116 (FIG. 10) and the independent signal generator is used to supply the desired signals to summing nodes 177a and 177c. As previously described, such an embodiment can be used to test the tolerance of the power system to non-fundamental frequency signals. Accordingly, the present invention is only limited by the following claims.

I claim:

1. A current injection device for injecting current onto an AC power line, wherein said power line is operated at a line voltage which exhibits a fundamental frequency, said current injection device comprising:

a current generator; and an impedance connected between said current generator and said power line, wherein said current generator generates a current component at said fundamental frequency which is transmitted through said impedance to said power line, whereby said current component causes a voltage drop across said impedance, wherein said voltage drop is within a selected range about said line voltage.

2. The current injection device of claim 1, wherein said selected range is equal to approximately 25 percent to approximately 150 percent of said line voltage.

3. The current injection device of claim 1, wherein said voltage drop is approximately equal to said line voltage.

4. The current injection device of claim 1, wherein said impedance is a capacitor.

5. The current injection device of claim 4, wherein said current component lags said line voltage by approximately 90 degrees.

6. The current injection device of claim 1, wherein said impedance is a capacitor in parallel with an inductor.

7. The current injection device of claim 1, further comprising:

a voltage sensing circuit coupled to said power line, wherein said voltage sensing circuit senses said line voltage and in response, generates a control signal proportional to said line voltage; and a current pump control circuit coupled to said voltage sensing circuit and said current generator, wherein said current pump control circuit generates a current pump signal having said fundamental frequency in response to said control signal, wherein said current pump signal is proportional to said line voltage and lags said line voltage by approximately 90 degrees, wherein said current generator receives said current pump signal and generates said current component in response to said current pump signal.

8. A current injection device for injecting current onto a four-conductor, three-phase power line, said current injection device comprising:

a first transducer coupled to a first conductor of said power line, wherein said first transducer senses a current on said first conductor;

a second transducer coupled to a second conductor of said power line, wherein said second transducer senses a current on said second conductor;

a third transducer coupled to a third conductor of said power line, wherein said third transducer senses a current on said third conductor;

a first summing circuit having first, second and third positive input terminals and an output terminal, wherein said first, second and third positive input terminals of said first summing circuit are coupled to said first, second and third transducers, respectively, and wherein said first summing circuit generates a first signal representative of a current on a neutral conductor of the power line;

an attenuator circuit having an input terminal and an output terminal, wherein the input terminal of said attenuator circuit is coupled to the output terminal of said first summing circuit, whereby said attenuator circuit receives the first signal and divides the first signal by three to create an second signal;

a second summing circuit having a positive input terminal coupled to said first transducer, a negative input terminal coupled to the output terminal of said attenuator circuit, and an output terminal;

a third summing circuit having a positive input terminal coupled to said third transducer, a negative input terminal coupled to the output terminal of said attenuator circuit, and an output terminal; and a current generator having first and second input terminals, wherein the output terminal of said second summing circuit is coupled to said first input terminal of said current generator and the output terminal of said third summing circuit is coupled to said second input terminal of said current generator, the current generator further having first, second and third output terminals coupled to the first, second and third conductors of the power line, respectively, the current generator providing a first current, a second current and a third current at the first, second and third output terminals of the current generator, respectively, in response to signals received from the second and third summing circuits.

9. The current injection device of claim 8, wherein said current generator generates the first current in response to a signal received from the second summing circuit, the third current in response to a signal received from the third summing circuit, and the second current by generating a current equal to the negative sum of the first and second currents.

10. The current injection device of claim 8, wherein said four-conductor, three-phase power line carries a three-phase current having a fundamental frequency, the current injection device further comprising:

a first fundamental frequency filter coupled between the output terminal of said second summing circuit and said first input terminal of said current generator; and a second fundamental frequency filter coupled between the output terminal of said third summing circuit and said second input terminal of said current generator.

11. A current injection device for injecting current onto a four-conductor, three-phase power line, said current injection device comprising:

first current sensing means for sensing currents on a first conductor of said power line;

second current sensing means for sensing currents on a second conductor of said power line;

third current sensing means for sensing currents on a third conductor of said power line;

a first summing circuit coupled to the first, second and third current sensing means, wherein said first summing circuit generates a first signal proportional to the sum of the currents sensed by the first, second and third current sensing means, the first signal being representative of currents on a neutral conductor of the power line;

attenuating means coupled to said first summing circuit, wherein said attenuating means generates a second signal proportional to negative one third of the first signal wherein said second signal is provided to an output terminal of said attenuating means;

first summing means having a first input terminal coupled to said first sensing means, a second input terminal coupled to said output terminal of said attenuating means, and an output terminal;

second summing means having a first input coupled to said third sensing means, a second input coupled to said output terminal of said attenuating means, and an output terminal; and a current generator having a first input terminal coupled to said output terminal of said first summing means and a second input terminal coupled to said output terminal of said second summing means, the current generator further having first, second and third output terminals coupled to the first, second and third conductors of the power line, respectively, the current generator providing a first current, a second current and a third current at the first, second and third output terminals of the current generator, respectively, in response to signals received from said first and second summing means.

12. The current injection device of claim 11, wherein said current generator generates the first current in response to a signal received from the first summing means, the third current in response to a signal received from the second summing means, and the second current in response to signals received from both the first and second summing means.

13. A method of injecting current onto an AC power line, wherein said power line is operated at a voltage having a fundamental frequency, said method comprising the steps of:

sensing said voltage on said power line;

generating a current component in response to said voltage, wherein said current component has a frequency equal to said fundamental frequency and said current component lags said voltage by approximately 90 degrees; and transmitting said current component through an impedance to said power line, whereby the voltage drop across said impedance caused by said current component is within a selected range about said voltage on said power line.

14. The method of claim 13, wherein said selected range is equal to approximately 25 percent of said voltage on said power line to approximately 150 percent of said voltage on said power line.

15. The method of claim 13, wherein said voltage drop is approximately equal to said voltage on said power line.

16. The method of claim 13, wherein said impedance is a capacitor.

17. The method of claim 13, wherein said impedance is a capacitor in parallel with an inductor.

18. A method of generating current components for injection onto a four-conductor, three-phase AC power line having first, second, third and neutral conductors, said method comprising the steps of:

generating first, second and third signals which are representative of currents flowing on said first, second and third conductors, respectively;

generating a fourth signal which is representative of two-thirds of said first signal minus one-third of said second signal minus one-third of said third signal;

generating a fifth signal which is representative of two-thirds of said third signal minus one-third of said first signal minus one-third of said second signal;

generating a first current component in response to said fourth signal;

generating a third current component in response to said fifth signal;

generating a second current component in response to said fourth and fifth signals, wherein said second current component is equal to the negative sum of said first current component and said second current component;

applying said first current component to said first conductor;

applying said second current component to said second conductor; and applying said third current component to said third conductor, wherein currents flowing on the neutral conductor of the power line are distributed among the first, second and third conductors of the power line.

19. The method of claim 18, further comprising the steps of:

filtering a fundamental frequency component out of said fourth signal; and filtering a fundamental frequency component out of said fifth signal.

20. A current injection device for injecting current onto a four-conductor, three-phase power line, said current injection device comprising:

a first transducer coupled to a first conductor of said power line, wherein said first transducer provides a first control signal representative of a current on said first conductor;

a second transducer coupled to a second conductor of said power line, wherein said second transducer provides a second control signal representative of a current on said second conductor;

a third transducer coupled to a third conductor of said power line, wherein said third transducer provides a third control signal representative a current on said third conductor;

a first summing circuit coupled to said first, second and third transducers, whereby said first summing circuit receives said first, second and third control signals, and in response, adds the first, second and third control signals, thereby creating a first sum signal which is representative of a current on a neutral conductor of said power line;

an averaging circuit coupled to said first summing circuit, whereby said averaging circuit receives said first sum signal, and in response, generates an average sum signal which is representative of the first sum signal divided by three;

a second summing circuit coupled to said first transducer and said averaging circuit, whereby said second summing circuit receives said first control signal and said averaged sum signal, and in response, generates a second sum signal representative of the first control signal minus the average sum signal;

a third summing circuit coupled to said third transducer and said averaging circuit, whereby said third summing circuit receives said third control signal and said averaged sum signal, and in response, generates a third sum signal representative of the third control signal minus the average sum signal; and a current generator coupled to said second summing circuit, said third summing circuit, and said first, second and third conductors of said power line, wherein the current generator receives the second and third control signals, and in response, injects a first control current on the first conductor, a second control current on the second conductor and a third control current on the third conductor.

* * * * *